United States Patent
King

(10) Patent No.: US 9,403,935 B2
(45) Date of Patent: Aug. 2, 2016

(54) TWO DIMENSIONAL POLYMERS AND METHODS OF MAKING SAME

(71) Applicant: Benjamin T. King, Reno, NV (US)

(72) Inventor: Benjamin T. King, Reno, NV (US)

(73) Assignee: Board of Regents of the Nevada System of Higher Education on behalf of the University of Nevada, Reno, Reno, NV (US)

( * ) Notice: Subject to any disclaimer, the term of this patent is extended or adjusted under 35 U.S.C. 154(b) by 136 days.

(21) Appl. No.: 13/950,995

(22) Filed: Jul. 25, 2013

(65) Prior Publication Data

US 2014/0031448 A1 Jan. 30, 2014

Related U.S. Application Data

(60) Provisional application No. 61/675,748, filed on Jul. 25, 2012.

(51) Int. Cl.
*C08F 32/00* (2006.01)
*C08G 61/02* (2006.01)
*C08G 61/10* (2006.01)

(52) U.S. Cl.
CPC ............... *C08G 61/02* (2013.01); *C08F 32/00* (2013.01)

(58) Field of Classification Search
CPC .......... C08G 61/02; C08G 61/10; C08F 32/00
See application file for complete search history.

(56) References Cited

U.S. PATENT DOCUMENTS

| | | | |
|---|---|---|---|
| 6,605,693 B1 | 8/2003 | Becker et al. | |
| 6,783,814 B2* | 8/2004 | Swager et al. | 428/11 |
| 7,494,698 B2* | 2/2009 | Swager et al. | 428/11 |
| 2002/0150697 A1* | 10/2002 | Swager et al. | 428/1.1 |
| 2004/0170775 A1* | 9/2004 | Swager et al. | 428/1.1 |
| 2008/0188634 A1* | 8/2008 | Swager et al. | 526/280 |

OTHER PUBLICATIONS

Long, T. M. and Swager, T. M. (2001), Minimization of Free Volume: Alignment of Triptycenes in Liquid Crystals and Stretched Polymers. Adv. Mater., 13: 601-604.*
Bhola et al., "Two-Dimensional Polymers Based on Antrip," *14th International Symposium on Novel Aromatic Compounds*, Poster 107, 2001.
Ghanem et al., "A triptycene-based polymer of intrinsic microposity that displays enhanced surface area and hydrogen adsorption," *Chem. Commun.*, 67-69, 2007.
Sydlik et al., "Triptycene-Containing Polyetherolefins Via Acyclic Diene Metathesis Polymerization," *Journal of Polymer Science, Part A: Polymer Chemistry*, 51, 1695-1706, 2013.

* cited by examiner

*Primary Examiner* — Sanza McClendon
(74) *Attorney, Agent, or Firm* — Klarquist Sparkman, LLP

(57) ABSTRACT

The present invention relates to two dimensional polymers and methods of making the same. Irradiation of polycyclic, three bladed monomers, such as polyaromatic, three bladed monomers or an antrip monomer, derivatives or analogs thereof, with ultraviolet radiation provides the two dimensional polymers, which may be used in membrane applications.

14 Claims, 8 Drawing Sheets

TWO DIMENSIONAL POLYMERS AND METHODS OF MAKING SAME

CROSS-REFERENCE TO RELATED APPLICATIONS

This application claims the benefit of and priority to prior filed U.S. Provisional Application Ser. No. 61/675,748, filed Jul. 25, 2012, which is expressly incorporated herein by reference in its entirety.

GOVERNMENT LICENSE RIGHTS

This invention was made with government support under grant number CHE-0957702 awarded by the National Science Foundation. The government has certain rights in the invention.

FIELD OF THE INVENTION

This invention relates to two dimensional polymers, and more specifically to two dimensional polymers derived from polycyclic, three-bladed monomers and methods of making same.

BACKGROUND

Two-dimensional polymers (2DPs) are a new type of material with enormous potential. A two dimensional polymer (2DP) is a sheet-like monomolecular macromolecule having laterally connected repeat units with end groups along all edges. 2DPs can be represented as molecular tilings where the repeat units are the vertices and the bonds connecting them are the edges.

Relevant traits of 2DPs are periodicity; they are preferably regular, not ill defined and tangled, and thinness, in at least some implementations, they should approach the limit of a single repeat unit layer. These traits may allow for controlled behavior at the nanoscale, and thus provide new materials that can be useful in a variety of applications, such as in forming membranes for separations.

Individual layers or sheets of graphite (called graphenes), molybdenum disulfide ($MoS_2$), boron nitrides (($BN)_x$), and layered silicates are examples of known two dimensional polymers. While the properties of graphene are remarkable, its structure is fixed. It could be advantageous to have ability to control the structure and properties by designed synthesis. Moreover, some of the 2DPs of the prior art, such as graphene, are obtained by pyrolytic or related procedures, which require extreme processing conditions.

Accordingly, new 2DPs and new methods of making the 2DPs are needed.

SUMMARY

Representative embodiments of the present disclosure are described in the appended claims. There are additional features and advantages of the various embodiments of the present disclosure. They will become evident from the following disclosure.

In this regard, it is to be understood that the appended claims are a brief summary of the various embodiments described herein. Any given embodiment of the present disclosure need not provide all features noted above, nor must it solve all problems or address all issues in the prior art noted above.

In accordance with an embodiment, a two-dimensional polymer derived from a polycyclic, three-bladed monomer is provided.

In accordance with another embodiment, a method of making a two dimensional polymer derived from a polycyclic, three-bladed monomer is provided. The method includes forming crystals of the monomer from a first organic solvent; isolating the crystals of the monomer; and irradiating the crystals of the monomer in a solid-state with ultraviolet radiation to form the two dimensional polymer in the solid state.

According to one aspect, the polycyclic, three-bladed monomer is a polyaromatic, three-bladed monomer. According to another aspect, the polycyclic, three-bladed monomer is an antrip monomer, or derivatives or analogues thereof, which comprises a triptycene core and three anthracene moieties. According to another aspect, the monomers may be derivatized on the triptycene core. According to yet another aspect, the monomers may be derivatized at one or more of the anthracenyl groups. For example, the derivatized monomers may include substituents such as deuterium, halides such as fluoride, and polyethylene glycols such as diethylene glycol at aryl or bridgehead positions.

According to another aspect, a method of making a two dimensional polymer including repeat units that are derived from a substituted antrip monomer organized at a liquid surface. Suitable substituted antrip monomers may bear polar functionality like oligo- or polyethylene glycol substituents at the bridgehead or other positions, and may be halogenated or otherwise functionalized at other positions. The method comprises forming crystals of the substituted antrip monomer at a liquid surface; and irradiating the crystals of the substituted antrip monomer at the liquid surface with ultraviolet radiation to form the two dimensional polymer.

In another embodiment, the method may further include suspending the two dimensional polymer in the solid state in a second organic solvent; and exfoliating sheets of the two dimensional polymer. Further, the method may include isolating the exfoliated sheets of the two dimensional polymer, for example, by centrifugation and/or filtration.

In accordance with another embodiment of the present invention, the two dimensional polymers may be used to form membranes that can be useful for performing separations.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end points (unless specifically excluded) and any and all intermediate ranges between the endpoints.

Although methods and materials similar or equivalent to those described herein can be used in the practice or testing of the present disclosure, suitable methods and materials are described herein. The disclosed materials, methods, and examples are illustrative only and not intended to be limiting.

Iptycenes belong to a class of aromatic compounds having three arene units fused to bicyclo[2.2.2]octatriene bridgehead. The simplest iptycene is triptycene, where the arene units are phenyl groups. The sp² hybridization of the arene carbons, in combination with the bridgehead configuration provides a rigid monomeric framework comprising three blades, from which new monomers that are useful for preparing new 2DPs, may be realized.

In the most general sense, the 2DPs of the present invention are derived from polycyclic, three bladed monomers. For example, the polycyclic, three bladed monomers may be polyaromatic, three bladed monomers. In accordance with an embodiment of the present invention, the arene units of triptycene are extended to form anthracene moieties to form an antrip monomer, as well as derivatives and analogues thereof. In accordance with another embodiment, the antrip monomer comprises a triptycene core and three anthracene moieties.

Thus, in accordance with another embodiment of the present invention, the 2DPs can be derived from an antrip monomer having the general formula (I):

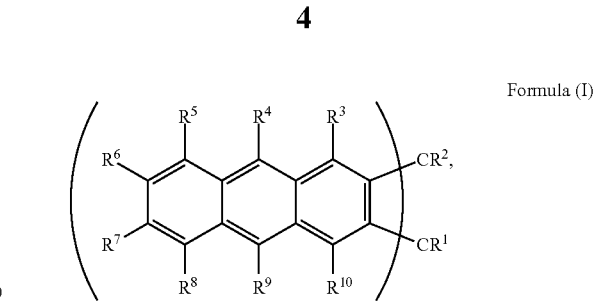

Figure 1:
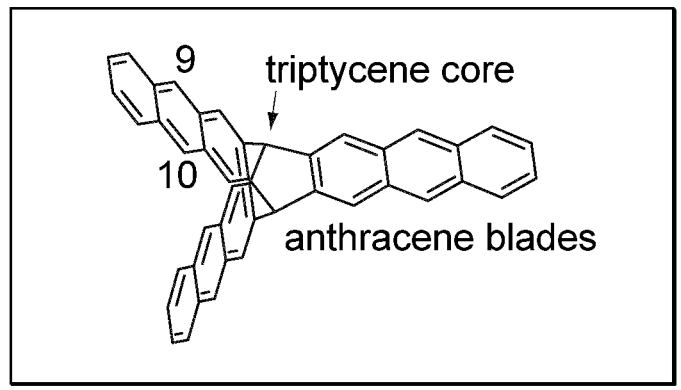
FIG. 1 is a chemical drawing of an antrip monomer, which includes a triptycene core and having three unsubstituted anthracene moieties.

Formula (I)

wherein $R^1$-$R^2$ are independently selected from the group consisting of hydrogen, deuterium, a halide such as fluoride, an unsubstituted alkyl group, a substituted alkyl group, and a polyethylene glycol group such as a diethylene glycol. According to another embodiment, $R^1$-$R^{10}$ are independently selected from hydrogen or deuterium. According to another embodiment, $R^1$-$R^{10}$ are each hydrogen, which provides the antrip monomer shown in FIG. 1. According to another embodiment, $R^1$-$R^3$ and $R^6$-$R^{10}$ are hydrogen; and $R^4$ and $R^9$, which are at the C9 and C10 positions of the anthracene moiety, are deuterium to provide what is hereinafter referred to as "d₆-antrip." According to yet another embodiment, at least one of $R^1$ or $R^2$ is a polyethylene glycol group such as a diethylene glycol.

Synthesis of the antrip monomers can be accomplished via known methods, such as in accordance with the synthetic sequence described in Long, et al., *Adv. Mater.* 2001, 13 (8), 601-604, which is incorporated by reference herein. As shown in Scheme 1 below, the synthesis, which is described in more detail below, may begin with a Friedel-Crafts acylation of triptycene (1) with phthalic anhydride to give the trisketo acid (2) as a mixture of unidentified stereoisomers. This stereoisomeric mixture may be reduced and cyclized in one-step using hydriodic acid in acetic acid to provide a polycyclic mixture (3) where n is an integer of 0 to 3, followed by re-aromatization, which reliably provides the antrip monomer (4) on preparative scale. The specific reagents and conditions for reactions a-c are provided in the Examples.

SCHEME 1:

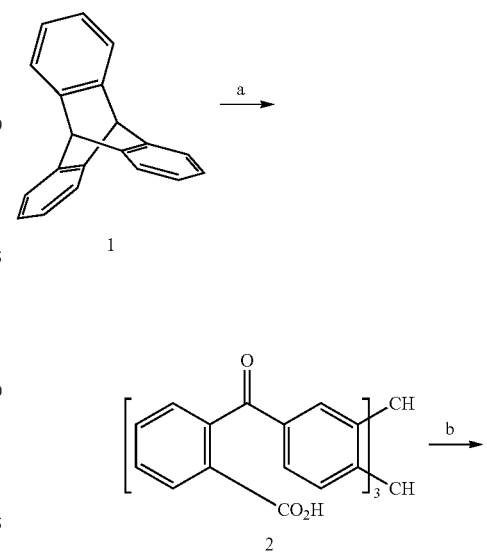

-continued

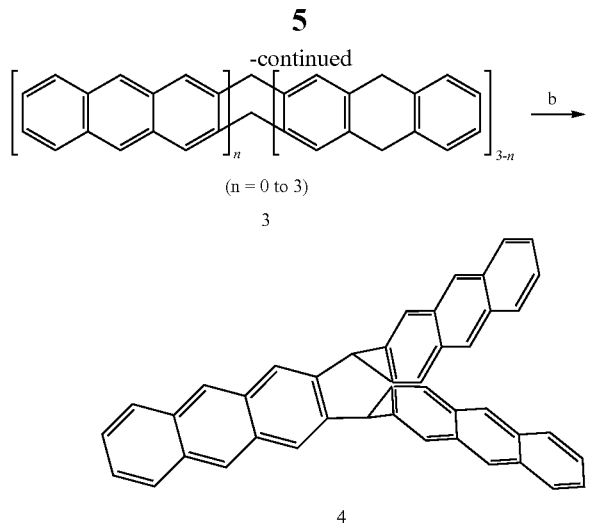

3
(n = 0 to 3)

4

In accordance with another embodiment of the present invention, an amphiphilic derivative of the antrip monomer is provided, where a polyethylene glycol group is incorporated into the monomer at the bridgehead of the triptycene core. In one example, the antrip monomer is substituted by a diethylene glycol group to provide antrip-DEG, identified below as compound (5), which may be prepared by the triple Freidel-Crafts addition of phthaloyl chloride (7) to methoxytriptycene (6) and a triple Freidel-Crafts cyclization to form hydroxyantrip quinone (8), which is then reduced to form partially hydrogenated hydroxyantrip (9), and then aromatized. Alternatively, a sequence involving: a Diels-Alder addition of furan to a benzyne intermediate derived from hexabromomethoxytriptycene (11) to form the cycloadduct (12); a second Diels-Alder of (11) with butadiene to form an extended cycloadduct (13); which is followed by a three-fold elimination to provide a hydrogenated methoxyantrip (14); which when oxidized forms methoxyantrip (15). Hydrolysis of the methyl ether of (15) affords the hydroxyantrip intermediate (10). Both of the foregoing synthetic sequences are shown in Scheme 2 below. The trityl protected polar side chain may be introduced using a Williamson ether synthesis protocol or other similar reactions, and then deprotected to provide antrip-DEG (5), as shown in Scheme 3 below.

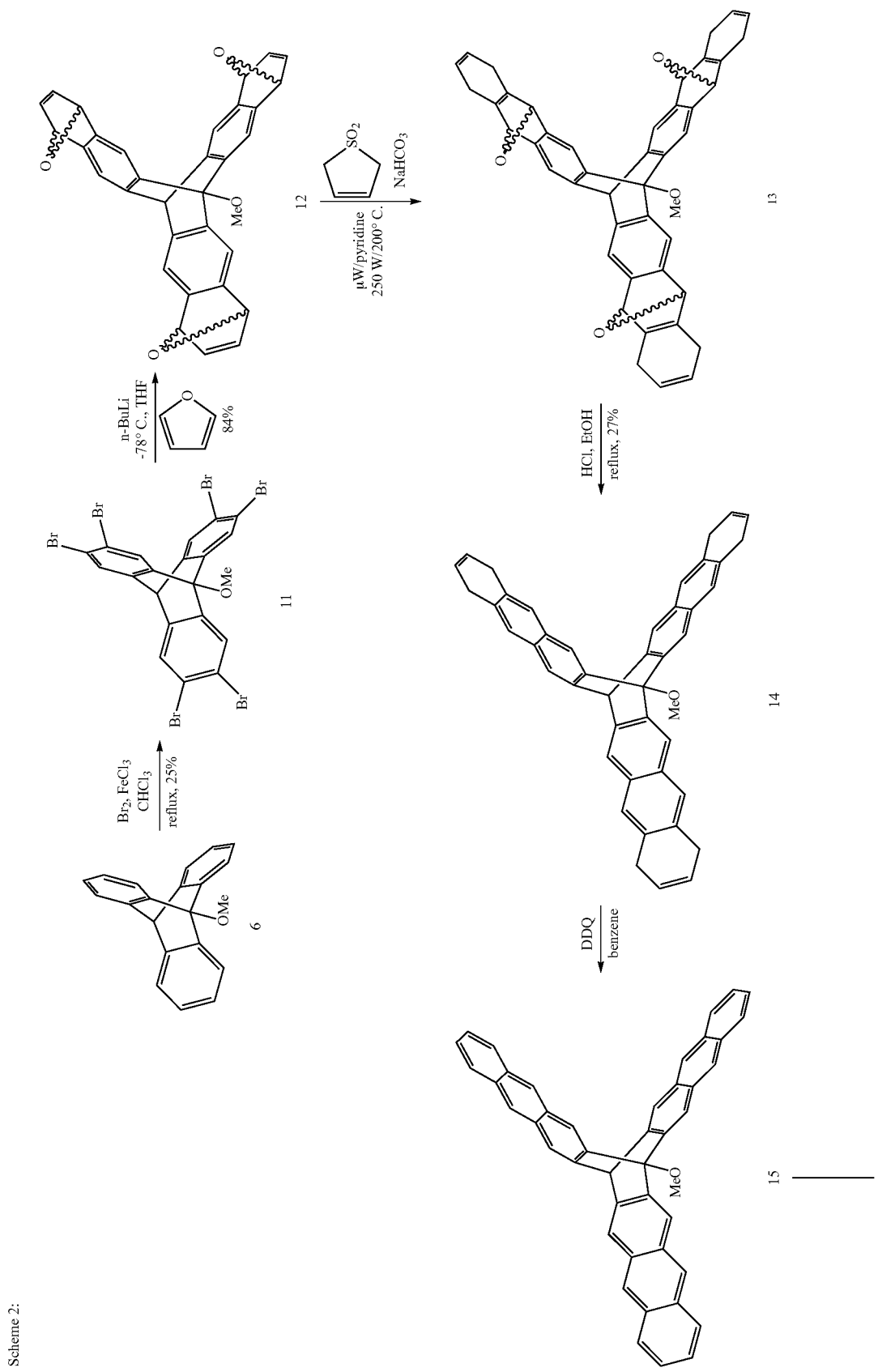
Scheme 2:

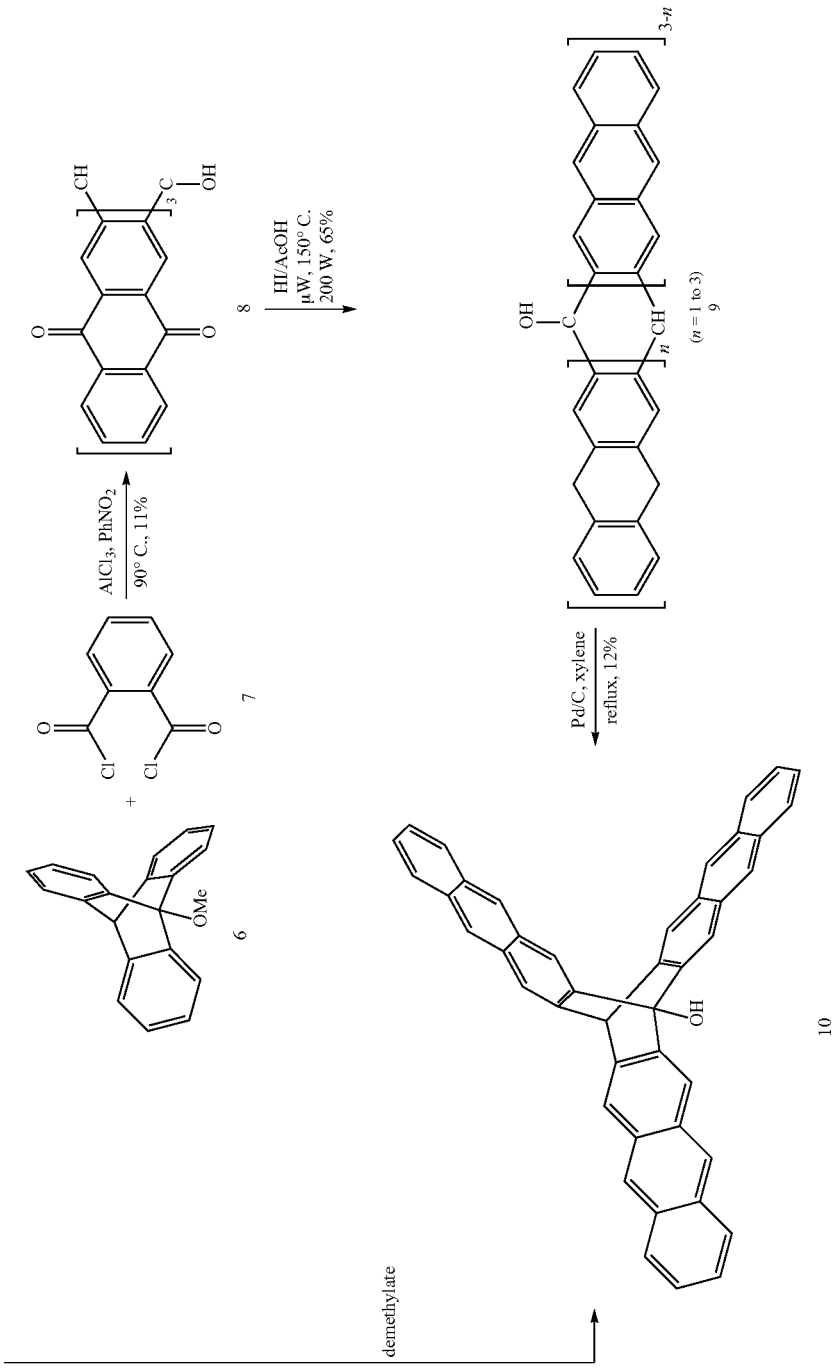

Scheme 3

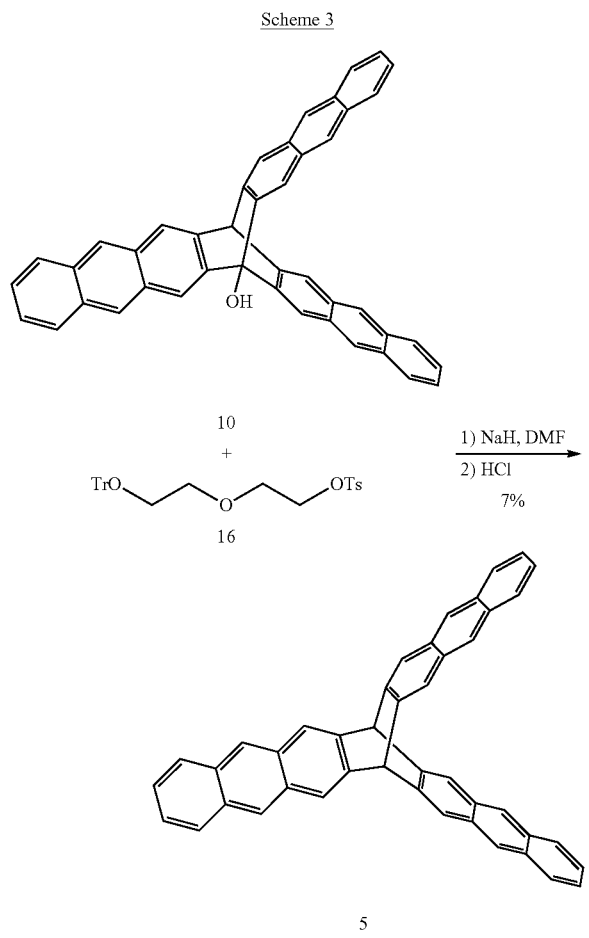

In accordance with another embodiment of the present invention, a method for the synthesis of 2DPs is provided. The method includes a photoinduced dimerization of polycyclic or polyaromatic, three bladed monomers, such as the antrip monomer, in its crystallized form. The approach described herein is somewhat related to the exfoliation of a layered covalent organic framework (COF) or metal organic framework (MOF), but there are distinct differences. A COF or MOF is formed in a simultaneous reaction/crystallization process, i.e., bonds are formed while the crystal forms. This type of dynamic process may present problems with crystal size, homogeneity, and packing motifs. In the disclosed approach, crystallization and bond formation are separated relying on simple crystallization to organize the monomers, which is then followed by solid-state photo-polymerization to make the bonds, a general method of which has been described in Wegner, et al., *Naturforsch. Teil B* 1969, 24, 824-832; and Schmidt, *Pure Appl. Chem.* 1971, 27, 647-678, each of which is incorporated by reference herein.

The chemistry and methodology that underlies this approach offers a unique advantage: 2DPs that are rugged hydrocarbons that, in contrast to the mineral-like $MoS_2$-type 2DPs and the COF/MOF 2DPs, offer chemical (water/acid/base/oxygen) resistance. The presence of well-defined pores is another major advantage, as exemplified by the state-of-the-art COFs, which have been exfoliated or grown as single-sheet 2DPs on graphene substrates. The disclosed approach may provide freestanding 2DPs with large pores, enabling their use as a membrane for separations.

Figure 2:
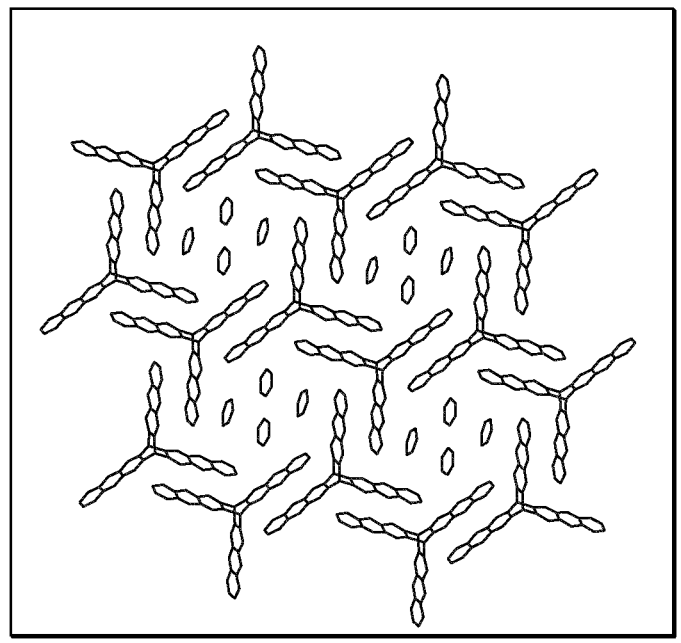
FIG. 2 is a depiction of an X-ray crystal structure of a crystallized form of the antrip monomer shown in FIG. 1 in its $P2_1/c$ polymorph as a benzene solvate, in accordance with an embodiment of the present invention.
Figure 3:
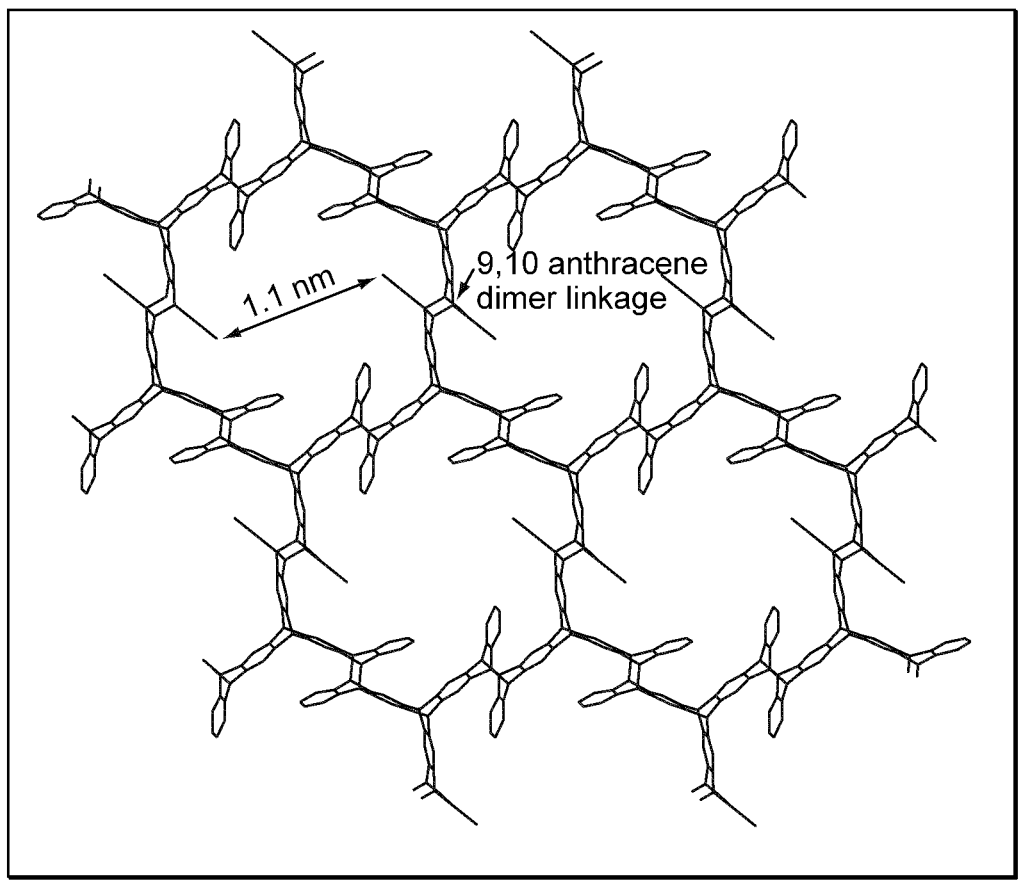
FIG. 3 is a simulated structure of a polyantrip, in accordance with an embodiment of the present invention.

Thus, in accordance with principles of the present method, polymerization is facilitated by the pre-organization of the monomer in its crystal lattice, which helps reduce or prevent random cross-linking. Utilizing the antrip monomer (4) as a model substrate, crystals of the antrip monomer can be obtained from a variety of different solvents. The crystals of the antrip monomer pack in three ways, i.e., P21/c, P21, and P63/m. The most common motif, the P21/c polymorph, can be observed as a benzene solvate, which is shown in the X-ray crystal structure in FIG. 2, upon crystallization from benzene. Upon treatment with radiation of the appropriate wavelength, dimerization of the anthracene moieties at the C9, C10 positions polymerizes the antrip monomer to form polyantrip, a simulation of which is shown in FIG. 3.

Figure 4A:
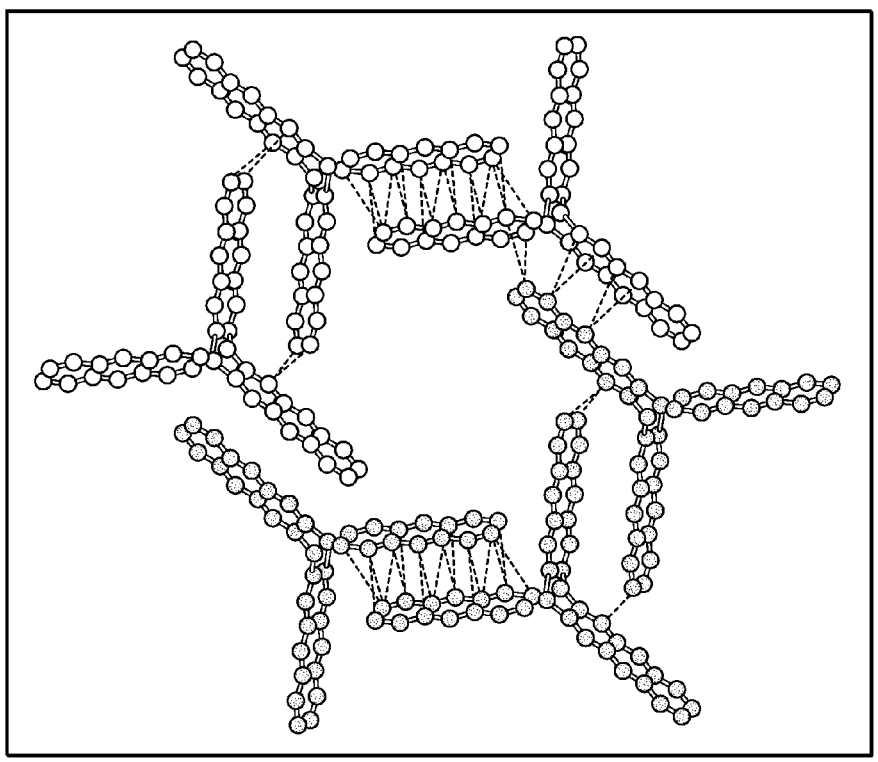
FIGS. 4A and 4B are perspective view depictions of a common packing arrangement of a crystallized antrip monomer looking down (FIG. 4A) and perpendicular to (FIG. 4B) a hexagonal channel formed in the crystal lattice.
Figure 4B:
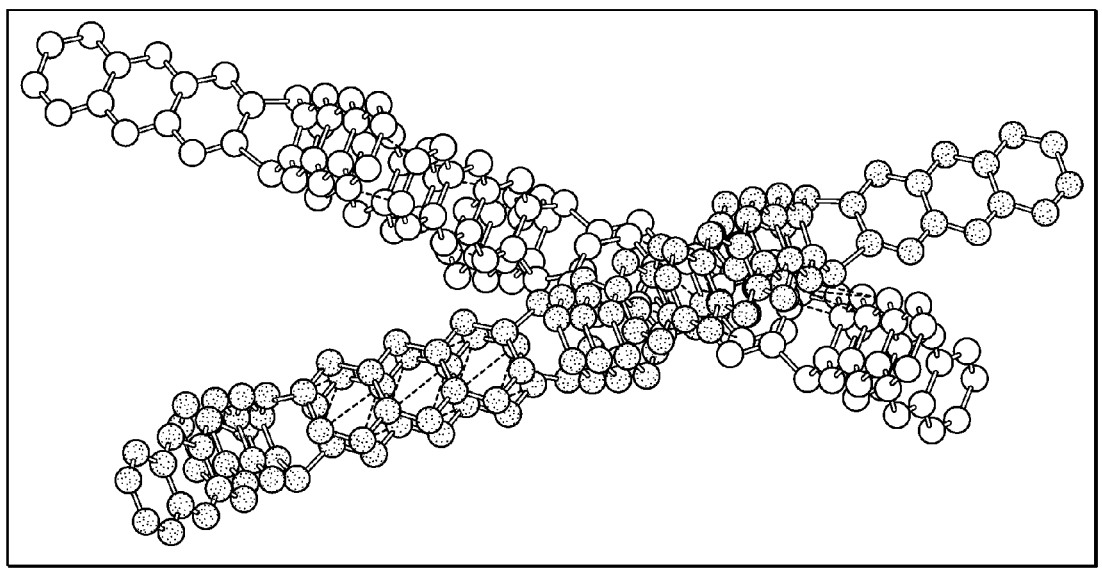

In addition to benzene, the P21/c polymorph of the crystallized antrip monomer solvate, which is also shown in FIGS. 4A and 4B with the solvent removed, may be provided by crystallization from tetrahydrofuran (THF), chlorobenzene, mesitylene, fluorobenzene, carbon disulfide, or chloroform to form the corresponding solvate. The antrip molecules in the P21/c polymorph form two sets of rows, tilted by 35+/−3°, and these rows align to form hexagonal channels that are filled by solvent. The rows are formed by the co-facial arrangement of two of the three anthracene blades. Due to the tilt, the structure is not lamellar, and the third anthracene blade does not co-facially stack. All these crystal solvates have P21/c symmetry except THF, which due to the orientation of the THF molecules, is P21. Nonetheless, the antrip packing is essentially the same for the seven solvates. The P21/c benzene solvate antrip monomer crystals reliably form large crystals and the photochemical polymerization is effective.

Figure 5:
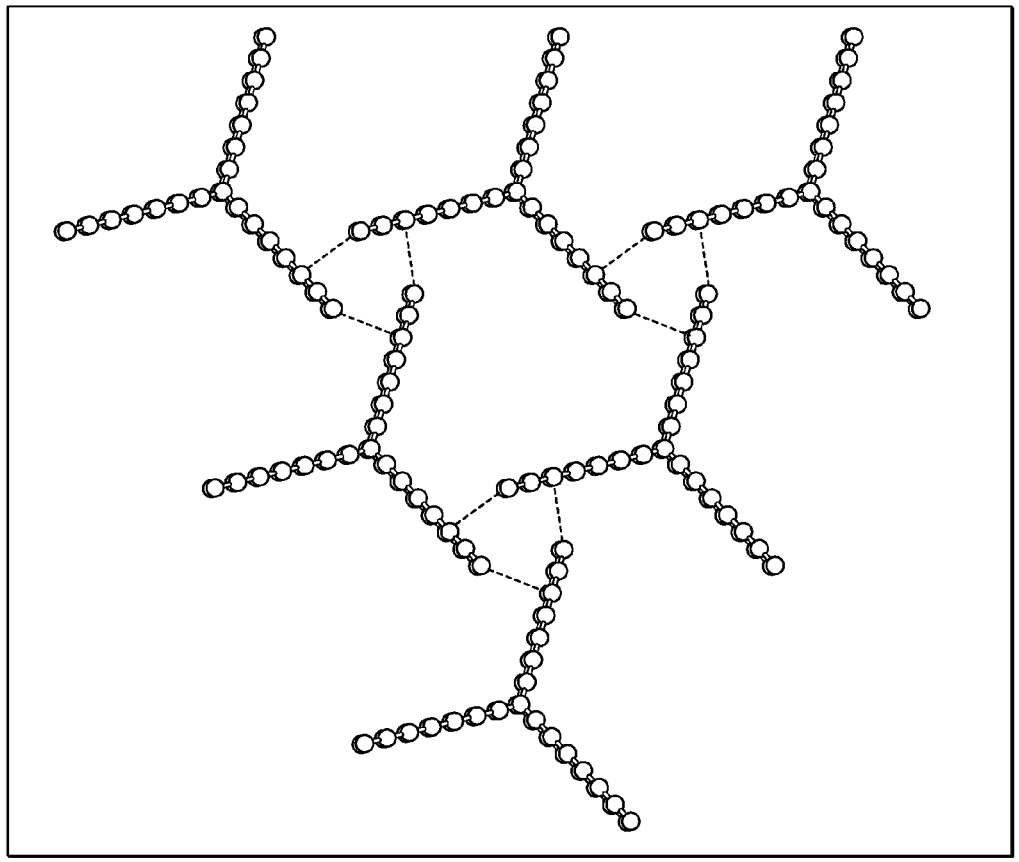
FIG. 5 is a depiction of an X-ray crystal structure of a crystallized form of the antrip monomer shown in FIG. 1 in its P63/m polymorph with solvent omitted.

A less common packing motif shown in FIG. 5 is found in polymorphs of the benzene and chloroform solvates of the antrip monomer. The lattice is hexagonal (P63/m) and completely lamellar. The blades of the P63/m polymorph of the antrip monomer exhibit C—H/π contacts instead of π stacking, and are not co-facial.

Figure 6:
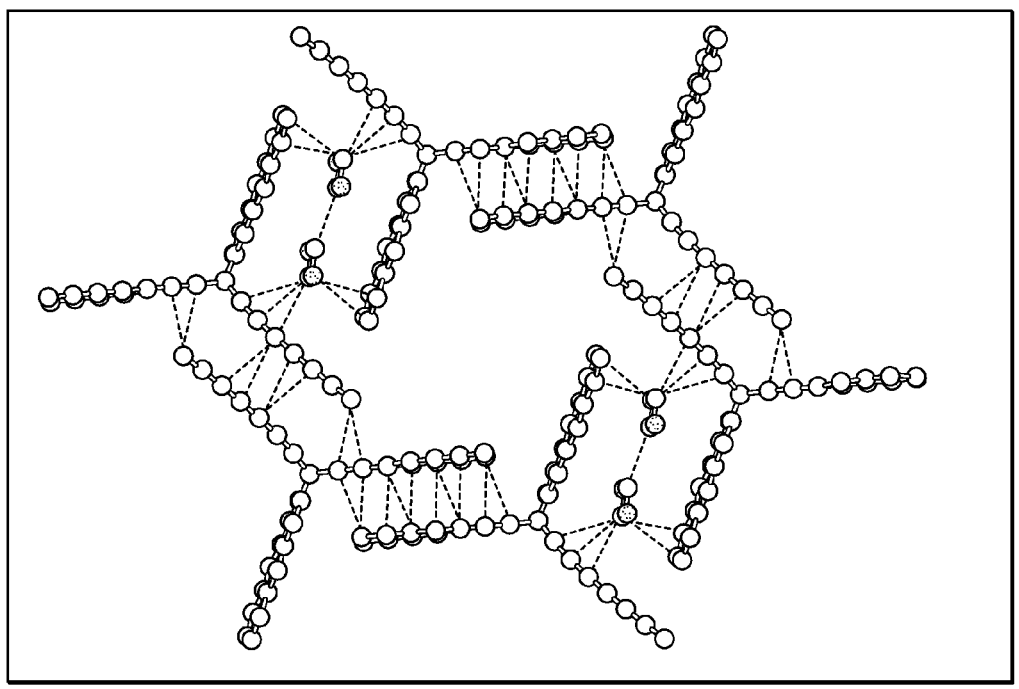
FIG. 6 is a depiction of an X-ray crystal structure of a crystallized form of the antrip monomer shown in FIG. 1 as a 1,2-dibromoethane solvate with solvent omitted from the formed channel.

The 1,2-dibromoethane solvate of the antrip monomer, which is shown in FIG. 6, is also perfectly lamellar, where two of the three anthracene blades cofacially stack. The third blade, although cofacially stacked, forms a sandwich with 1,2-dibromoethane. The parallelogram-shaped channels are filled by 1,2-dibromoethane and Br-π interactions are evident throughout. Photopolymerization of the benzene solvate (P21/c polymorph) as single crystals affords an insoluble, birefringent two dimensional polymeric material. The blocks of polyantrip retain the shape and birefringence of the original antrip monomer crystals but they diffract poorly. The vibrational spectra and solid state NMR establish that the anthracene moieties are fully cross-linked as 9,10-bridged anthracene dimers.

Figure 7:
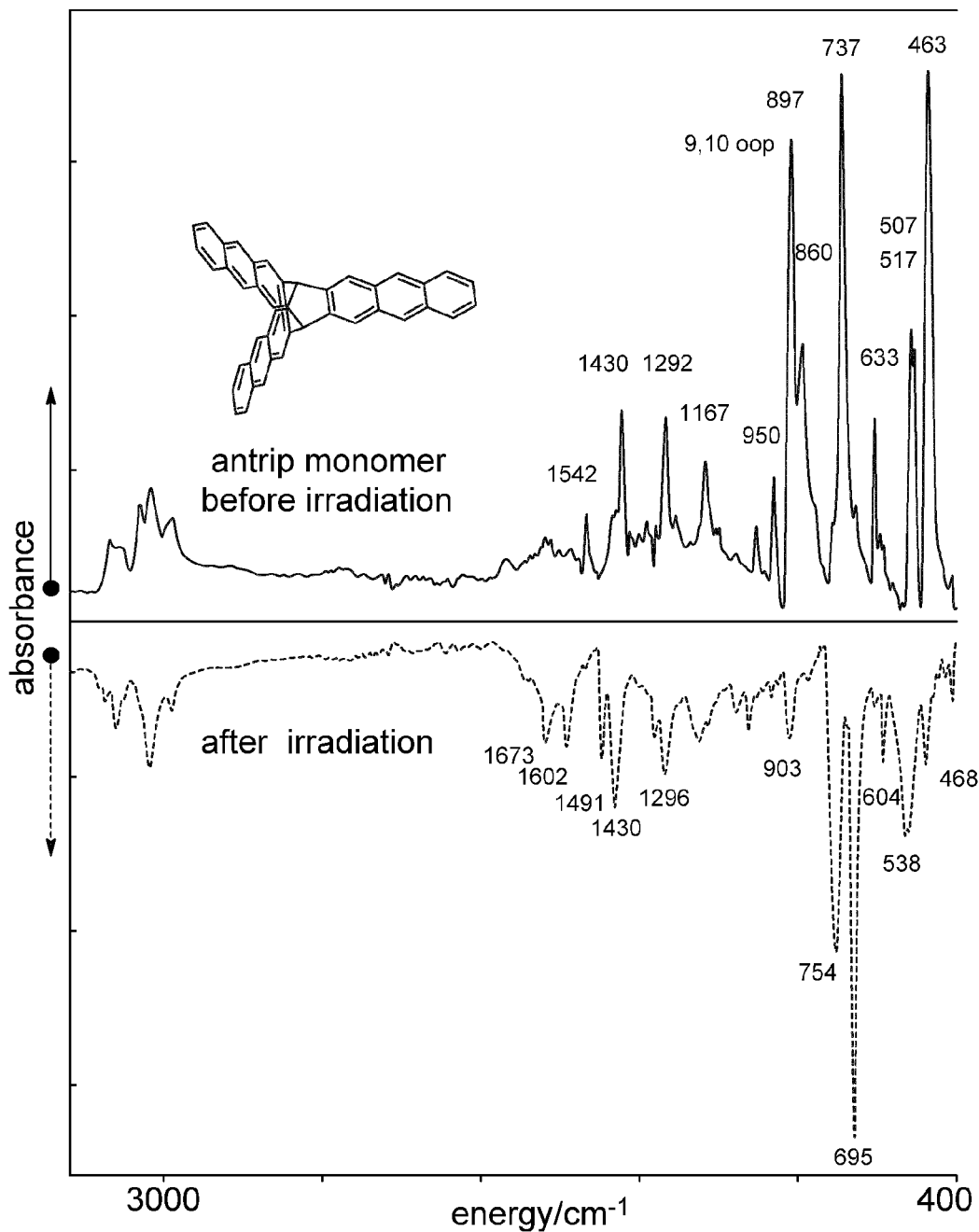
FIG. 7 shows infrared (IR) spectra of the antrip monomer shown in FIG. 1 (top) and its corresponding polymer (polyantrip) (bottom)

In accordance with an embodiment, the polyantrip 2DP is prepared by first forming crystals of the monomer from a first organic solvent; isolating the crystals of the monomer; and irradiating the crystals of the monomer in a solid-state with ultraviolet (uv) radiation to form the two dimensional polymer in the solid state. According to one example, the photopolymerization is carried out using a high-powered 400 nm light emitting diode at 0° C. under nitrogen. The photopolymerization reaction may be conveniently monitored by IR spectroscopy because the aryl CH out-of-plane stretch region changes significantly during the course of the reaction. In particular, the CH out-of-plane (oop) bend at 897 $cm^{-1}$ characteristic of the C9 and C10 positions (see FIG. 1 for nomenclature numbering) of the anthracene moiety completely disappears and is replaced by CH bends, which are characteristic of the anthracene dimer, as shown in the FIG. 7). The pronounced change in solubility, where the highly soluble antrip changes into substantially insoluble blocks, also reinforces the conclusion that antrip polymerized.

Some incidental observations, which are based on various analytical methods, such as infrared (IR) spectroscopy, nuclear magnetic resonance (NMR) spectroscopy, scanning electron microscopy (SEM), powder X-ray diffraction, polarized optical microscopy, and transmission electron microscopy (TEM), on the polymerization of the antrip monomer follow. Solvated benzene, which is normally difficult to remove, is quickly lost during the photopolymerization. The loss of benzene can be monitored by the loss of the 674 cm$^{-1}$ stretch in the IR spectrum, which is characteristic of benzene. The blocks of polyantrip retain the overall shape of the antrip monomer crystals but many cracks appear.

Figure 8:
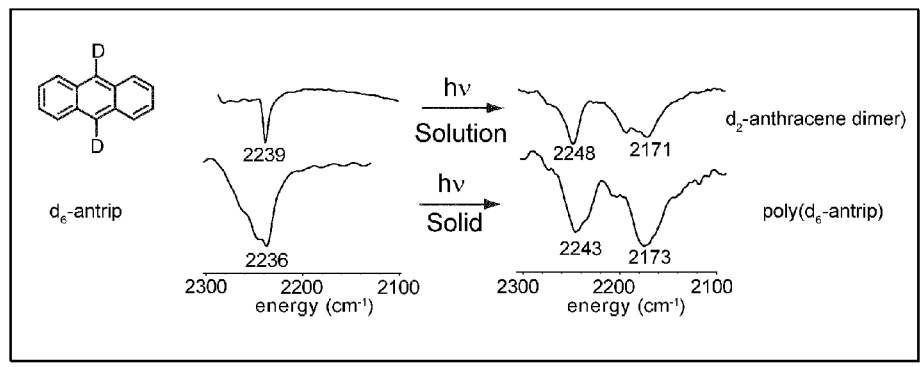
FIG. 8 is a comparison of IR spectra for d₂-anthracene and its dimer (top) and d₆-antrip and its polymer (poly(d₆-antrip)), which provides evidence of the cross-linking of the antrip monomer at the 9,10-positions of the anthracenyl groups.

IR spectroscopy may also be utilized to establish the identity of the photopolymerization reaction. To verify that antrip dimerized at the 9,10-positions, deuterium labels were incorporated at those positions. The IR spectra of labeled antrip, labeled polyantrip, and the analogous labeled anthracenes are shown in FIG. 8. The original C-D stretch disappears and two new resonances appear. These new resonances correspond to the B1u and B2u combinations of C-D stretches in dianthracene. Because the deuterium labels are introduced at specific positions, the differences in the IR spectra prove that crystalline antrip fully dimerizes at the 9,10 positions.

Figure 9:
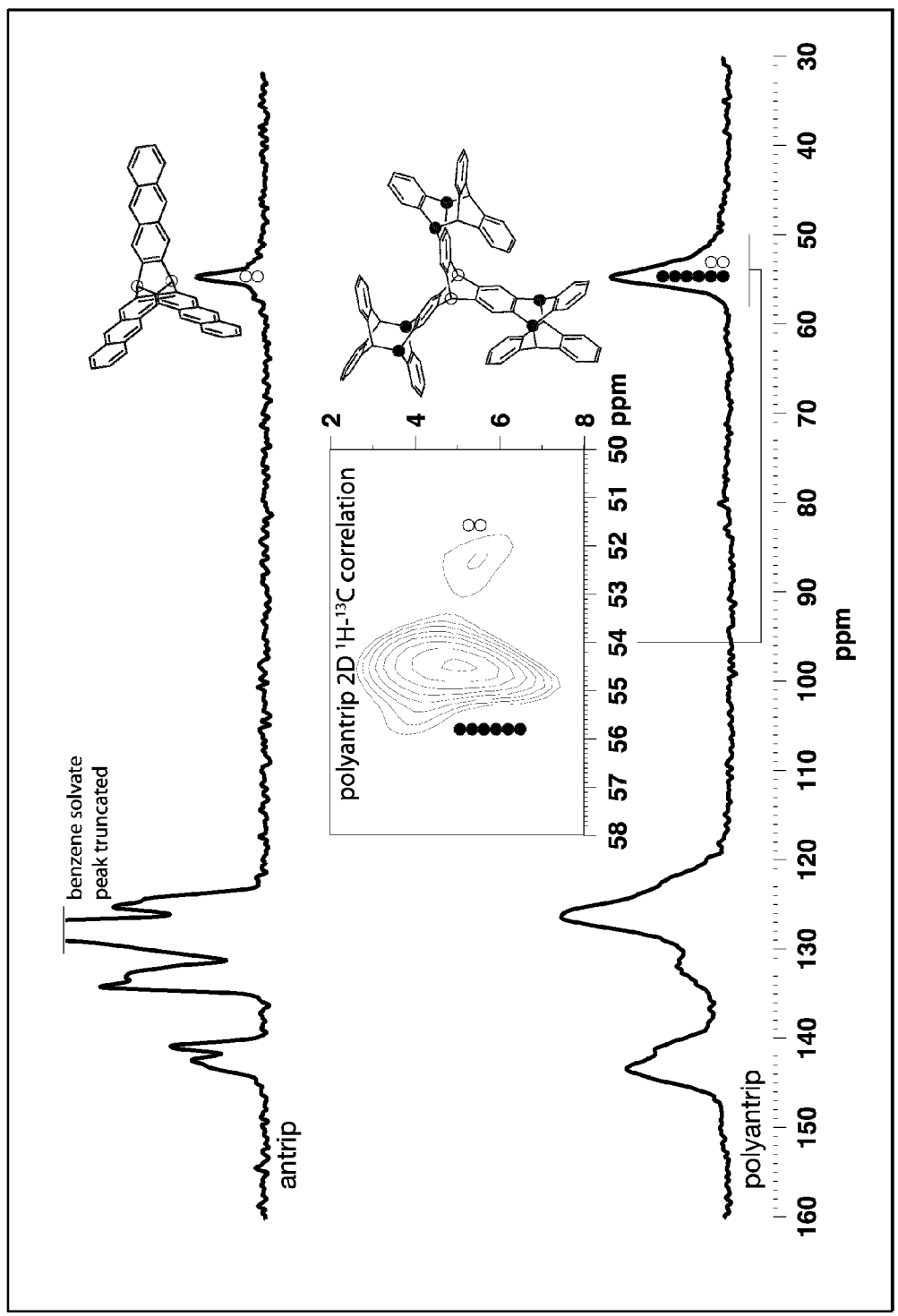
FIG. 9 shows solid-state nuclear magnetic resonance (NMR) spectra of the antrip monomer shown in FIG. 1 and its corresponding polyantrip.

This conclusion is further reinforced by solid-state NMR studies (700 MHz, 24,000 rpm). The key observations are the appearance of a second bridgehead resonance in the $^1$H-$^{13}$C-correlation spectrum and a significant increase in intensity of the bridgehead signal in the one dimensional $^{13}$C NMR spectrum (see FIG. 9). The chemical shift of the bridgehead protons of polyantrip is close to those of antrip ($\delta$(ppm) $^{13}$C, 53.3; $^1$H, 5.83) and the anthracene dimer ($\delta$(ppm) $^{13}$C, 53.7; $^1$H, 4.32).

Figure 10:
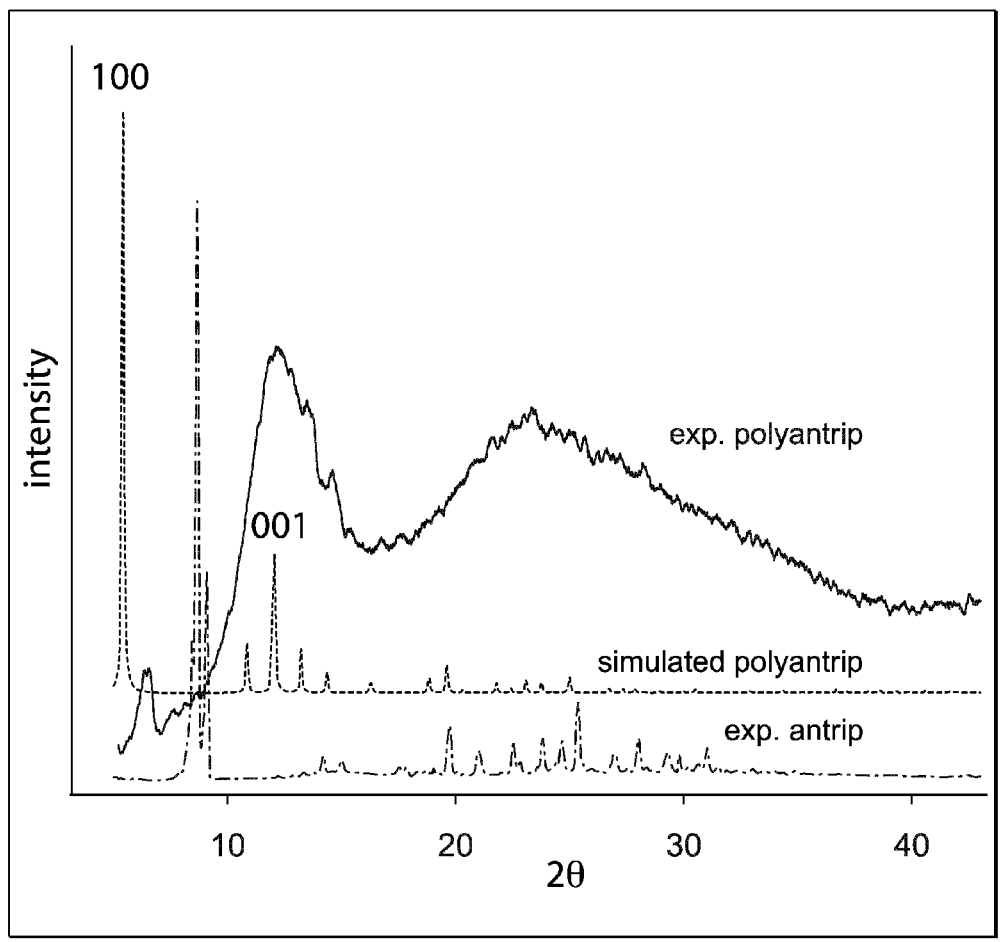
FIG. 10 shows a comparison of experimental powder x-ray diffraction patterns of the antrip monomer shown in FIG. 1 and its corresponding polyantrip, and a simulated powder x-ray diffraction pattern of a polyantrip.

After polymerization, the blocks retain their birefringence but diffract X-rays poorly. Accordingly, this material is referred to as polyantrip blocks, not crystals. FIG. 10 shows that the powder X-ray diffraction pattern for the experimental polyatrip blocks is consistent with the simulated X-ray diffraction pattern for the hexagonal packing represented in FIG. 2. In particular, it is noteworthy that the low angle (<10°) reflections, which correspond to the 100 Miller plane normal to the putative 2D lattice, shifts to larger spacing, in agreement with the simulated pattern. The error in the 100 reflection is within the uncertainty (~2 Å) of the calculated lattice. The appearance of new reflections around 12° also agree with the simulated layer-to-layer spacing, the 001 reflection.

Although polyantrip is substantially insoluble in all common solvents, the immersion of polyantrip blocks in some solvents induces exfoliation into thin sheets. From screening, preferred solvents for exfoliation were identified. Some solvents that induced exfoliation of polyantrip blocks into thin sheets include, N-methyl-pyrrolidone (NMP), dimethyl sulfoxide (DMSO), and quinoline. Optical microscopy reveals sheets that fold, bend, and overlap. Differential interference contrast (DIC) microscopy enhances the visibility of these sheets. 87% weight of exfoliated polyantrip sheets was recovered from polyantrip blocks. The missing mass can be attributed to either loss of solvent from the polyantrip lattice or the presence of the hexagonal (P63/m) polymorph, which does not appear to photopolymerize, or both.

Microscopy can be used to elucidate both the solid-state photopolymerization of antrip monomer and the exfoliation of polyantrip. The P21/c benzene solvate of the antrip monomer forms parallelepipeds that are strongly birefringent. Polyantrip retains the parallelepiped form, but cracks are evident, especially in the scanning electron microscope (SEM). SEM has also shown that one of the polyantrip blocks has been hollowed out, presumably by dissolution of unreacted monomer from the core of block.

Treatment with NMP causes the polyantrip blocks to separate into sheets, and the sheets retain their form and dimensions even after several weeks in NMP. The sheet-like form is evident from optical microscopy, revealing folds and overlaps. Polarized optical microscopy reveals that birefringence is essentially absent after extended treatment with NMP, only becoming evident at very long (minute) exposure times.

Figure 11:
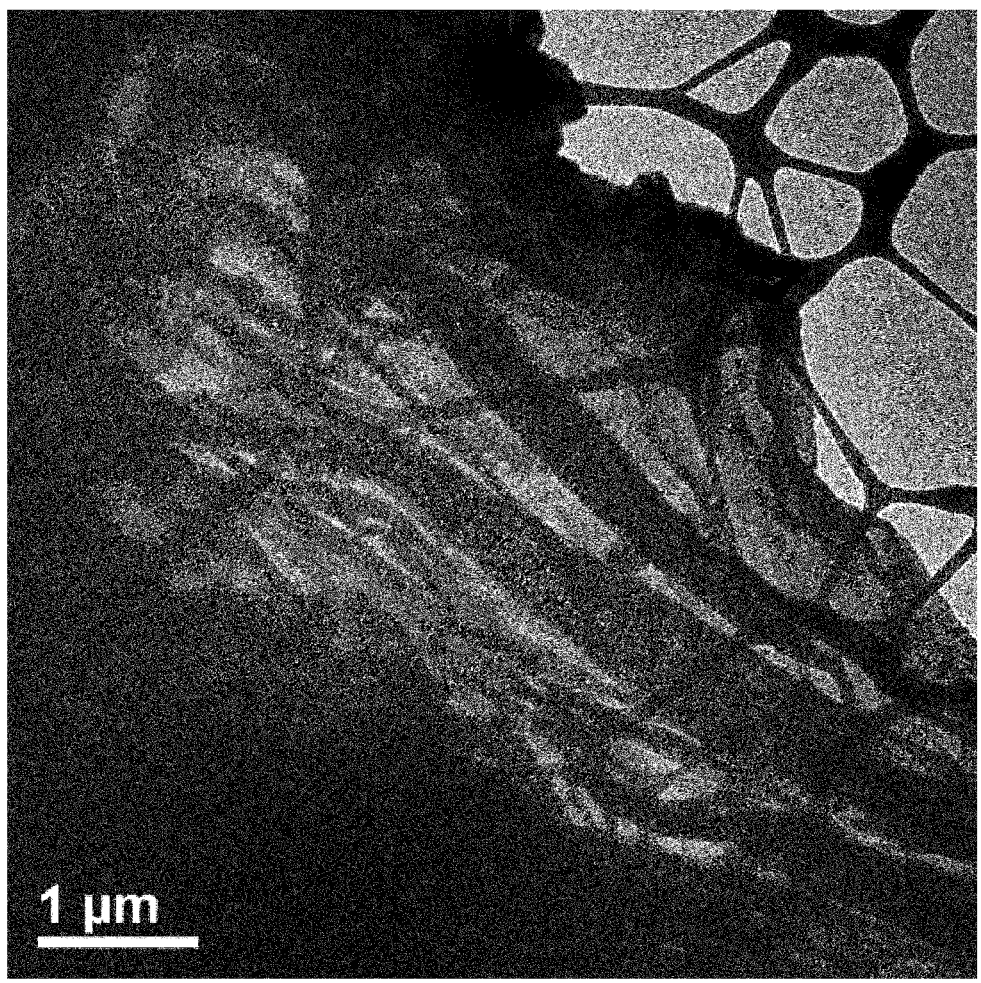
FIG. 11 is a magnified image provided by transmission electron microscopy (TEM) of exfoliated polyantrip.

Optical microscopy using transmission electron microscopy (TEM) reveals that the sheets of polyantrip are thinner than the microscope's focal depth of 1 µm. TEM shows the folds, wrinkles and the homogeneity of the sheets (see FIG. 11).

Microwave treatment of polyantrip blocks in DMSO yields the monomer antrip. The initially insoluble polyantrip in DMSO completely dissolves after the microwave irradiation, indicating the rupture of 9,10 bridging linkages in the polymer. The $^1$H NMR of the microwaved material in $d_6$-DMSO shows the antrip monomer peaks. The depolymerization also proves that photopolymerization occurs by 9,10 dimerization of anthracene blades in antrip and can be easily reversed by microwave irradiation. This is similar to the thermolysis of the anthracene dimer to anthracene.

In accordance with another embodiment, the 2DPs also can be prepared by polymerization of a thin film of the monomer at a gas-liquid (e.g. air-water) interface. Thus, in order facilitate this organization, a solution of an amphiphilic antrip monomer, such as the antrip-DEG monomer (5), in one or more volatile organic solvents is layered on a surface of water, and the organic solvent(s) may be evaporated. As used herein, amphiphilicity is provided by derivitizing the antrip monomer with a substituent having a polar (hydrophilic) terminus. Exemplary hydrophilic functional groups, include but are not limited to, a hydroxyl group. The hydrophilic functional group can be tethered to the monomer via a substituted or unsubstituted alkyl chain, or an ether moiety such as a polyethylene glycol group. The hydrophilic terminus facilitates orientation of the monomers at the air water interface. Photopolymerization of the layer at the air-water interface provides the 2DP as thin sheets, which thereby obviates the necessity to exfoliate the sheets from a polymeric block.

In one example, a film of monomeric antrip-DEG (5) is formed by depositing a dilute, e.g., 1 mg/mL, solution of antrip-DEG (5) in 1:1 (v/v) chloroform:cyclohexane or other organic solvents on the surface of water. Upon spreading of the antrip-DEG solution across the water surface, at the interface initial aggregation of organizing monomers (e.g., "islands" of organized monomers) can be observed, and in compression the islands coalesce into a substantially homogenous film. The expansion cycle, causes the formation of large sharp cracks in the film, resulting in the formation of fragments significantly larger than the initial islands. The resulting anti-DEG film was irradiated with a 365 nm light emitting diode on the interface, which causes a spike in the surface pressure, which can be attributed to an expansion of the film. By examination of possible packings, it is expected that monomers rearrange and move apart in order to form their polymerized network.

Poly(antrip-DEG) films can be transferred from the interface to a variety of substrates, including, for example, silica or highly order pyrolytic graphite (HOPG). Transfer to a TEM grid by the Langmuir-Shafer method revels that the film is free standing. In one embodiment, the poly(antrip-DEG) spans 361 μm² holes.

EXAMPLES

The present invention is illustrated by the following examples that are merely for the purpose of illustration and are not to be regarded as limiting the scope of the invention or the manner in which it can be practiced.

$^1$H and $^{13}$C spectra were fully assigned for the antripmonomer (4) using 1H-1H-COSY, HMQC and HMBC experiments. IR spectra were recorded using an ATR-FTIR over spectral range 4000-400 cm$^{-1}$. Mass spectra were recorded using an atmospheric pressure photoionization (APPI) source on a time of flight (TOF) instrument in the positive mode; the addition of toluene promotedionization.

Scanning electron microscopy (SEM): Scanning electron microscopy was performed using a LEO 1530 VP. As the samples are highly sensitive to radiation damage the acceleration voltage was kept at 3 kV or lower. For sample preparation, a copper TEM grid coated with a lacy carbon film (#01824, Ted Pella, Inc., Redding) was placed carbon side up on a Kimwipe®. A dispersion of the exfoliated sheets was deposited, dropwise, on to the grip so that the solvent would passthrough the grid and be absorbed by the Kimwipe®. The grid was then washed with 4 drops of chloroform. The sample was allowed to dry at room temperature for several hours before imaging.

Atomic force microscopy (AFM): AFM imaging was performed with a Nanosurfeasyscan II AFM (Nanoscience Instruments, Inc.) operated in contact mode at room temperature in air. App Nano silicon SICONA-10 cantilevers (Applied NanoStructures, Inc.) having a resonance frequency of 11-18 kHz and a spring constant of 0.1-0.6 N/m were used. Samples were prepared by placing a copper TEM grid with a lacy carbon film (#01824, Ted Pella, Inc., Redding) on a Kimwipe® with the coated side up. A dispersion of the exfoliated sheets was deposited, dropwise, onto the grid so that the solvent would pass through the grid and be absorbed by the Kimwipe®. The grid was then washed with 4 drops of chloroform. The sheets were then transferred to a freshly cleaved mica substrate by turning the grid over and passing a few drops of chloroform through the grid and onto the mica. The chloroform was allowed to evaporate and the mica was washed with fresh chloroform and allowed to dry for several hours at room temperature.

The x-ray crystal structure data was collected at 100 K using Mo Kα radiation (0.7107 nm). Solution and refinement were performed using the SHELXS and SHELXL (Sheldrick, 2008).

X-ray powder diagrams were recorded in transmission mode on a STOE Stadi-P diffractometer equipped with a Ge(111) monochromator and a linear position-sensitive detector. Cu—Kα1 radiation (I=1.5406 Å) was used. The sample was contained in a sealed glass capillary with 1 mm diameter, which was spun during the measurement. Data were recorded in a 2θ range from 2° to 60° with a step size of 0.5° and a recording time of 60 s per step. Attempts for structure determination from powder data included indexing, real-space methods (program DASH), and structure solution using structures derived by modelling. However, a reliable fit to the diffraction data could not be obtained.

Synthesis of 7,16-(2,3-anthraceno)-7,16-dihydroheptacene (4)

In one example, Triptycene(1) (1.0 g, 3.9 mmol) and phthalic anhydride (3.70 g, 24.9 mmol) were taken in a three-neck round bottom flask and tetrachloroethylene (50 mL) was added. The resulting solution was degassed and refilled with nitrogen. AlCl$_3$ (6.50 g, 48.7 mmol) was added and the reaction mixture was heated at 115° C. for 16 h. After the completion of reaction (by ESI/MS), the reaction mixture was cooled to room temperature and poured into an ice/5% aqueous HCl solution and stirred for 30 min. The resulting solids were filtered, washed with water, and dried under vacuum to give crude tris-ketoacid derivative (2). The crude product was dissolved in acetonitrile (100 mL) and filtered. The acetonitrile was evaporated to dryness to give tris-ketoacid derivative 2 (2.6 g) as a mixture of unidentified stereoisomers.

The tris-ketoacid derivative (2) was used without further purification. Tris-ketoacid mixture (5.5 g, 7.9 mmol) was dissolved in acetic acid (330 mL) and aqueous hydriodic acid 57% w/w (110 mL) was added to the solution. The mixture was heated at reflux for 4 days, cooled to room temperature, and then poured into water (200 mL). The precipitated solids were filtered, washed with water, and dried under vacuum. The crude product was dissolved in chloroform and passed through a silica plug. The solvent was evaporated to give a polycyclic mixture (3) (1.6 g) of antrip monomers in various states of hydrogenation. The polycyclic mixture (3) (1.5 g) was dissolved in xylenes (510 mL) and Pd/C (6.3 g) was added thereto. The mixture was heated at reflux for 2 days, cooled to room temperature, and filtered to remove the Pd/C solids. The filtrate was evaporated to give crude product (1.0 g, 45.8% over three steps). The crude product was further purified by column chromatography using hexane:toluene 1:1 to give (4) (308 mg, 14.1% over three steps), which was crystallized from minimum amount of hot benzene. m.p>300° C. (dec.) $^1$H NMR (500 MHz, CDCl$_3$): δ 5.81 (s, 2H), δ 7.34-7.28 (dd, J=6.7, 3.1 Hz, 6H), 7.88-7.82 (dd, J=6.5, 3.3 Hz, 6H), 8.04 (s, 6H), 8.29 (s, 6H). $^{13}$C NMR (125 MHz, CDCl$_3$): δ 53.3, 122.1, 125.3, 126.0, 128.2, 131.0, 131.9, 139.9. UV-Vis λmax/nm (chloroform) (log ε): 279 (5.13), 328 (3.83), 344 (3.99), 361 (4.09), 380 (3.85). FT-IR (KBr, cm$^{-1}$): 3040, 2950, 1652, 1558, 1429, 1290, 1165, 900, 737, 509, 466. HRMS (APPI-TOF) calcd for C$_{44}$H$_{26}$ 554.2034. found 554.2027.

Synthesis of Polyantrip

In one example, antrip monomer (4) crystals (50 mg, 0.09 mmol) were transferred to an evacuated chamber using pentane. The solvent was removed under vacuum and the evacuated chamber was filled with nitrogen. The crystals were irradiated at 0° C. using a 40 w, 400 nm light emitting diode (LedEngin, #LZC-70UA00) for 2 h.

Synthesis of d$_6$-Antrip (d$_6$-(4))

In one example, antrip monomer (4) (50 mg, 0.09 mmol) and p-toluenesulfonyl chloride (0.640 mg, 0.003 mmol) were combined in a microwave tube. To the mixture benzene (7 mL) was added followed by D$_2$O (0.32 mL). The reaction mixture was heated using a microwave at 150° C. and 150 W for 30 min. The reaction was quenched using sodium bicarbonate solution and the organic layer was extracted using benzene. The organic layer was evaporated. The residue was dissolved in chloroform:hexane (1:1) and passed through a plug of basic alumina. The solvent was evaporated to give clean d$_6$-(4) (32 mg, 63%). $^1$H NMR (400 MHz, CDCl$_3$) δ 8.30 (s, 1H), 8.05 (s, 6H), 7.96-7.88 (dd, J=6.4, 3.3 Hz, 6H), 7.42-7.34 (dd, J=6.6, 3.1 Hz, 4H), 5.82 (s, 2H). $^{13}$C NMR (101 MHz, CDCl$_3$): δ 53.4, 122.0, 125.3, 128.1, 130.9, 131.8, 139.9. FT-IR (KBr, cm-1): 3045, 2951, 2235, 1525, 1419, 1276, 1171, 884, 770, 503. HRMS calcd for $C_{44}H_{20}D_6$ 560.2411. found 560.2395.

Synthesis of Antrip-DEG (5)

In one example, $AlCl_3$ (13.5 g, 101 mmol) was taken in a three-neck round-bottomed flask and evacuated for 10 min. Then degassed nitrobenzene (60 mL) was added to the flask for dissolving the $AlCl_3$. In another flask, 9-methoxytriptycene (6) (2.0 g, 7.0 mmol) and phthaloyl chloride (7) (21 mmol) was dissolved in degassed nitrobenzene (40 mL). The solution of 9-methoxytriptycene (6) and phthaloyl chloride (7) was slowly added to $AlCl_3$ solution. The color of the solution turned red-brown. The reaction mixture was heated at 90° C. for 16 h, the color turned dark green-black. After that time, the reaction was cooled to room temperature and slowly poured over 10% HCl in ice slurry (100 mL concentrated HCl and 500 mL of ice) (CAUTION: The reaction is exothermic). The reaction mixture was stirred again at 100° C. for 2 h. The reaction was then cooled and hexane (200 mL) was added to precipitate the solids. The precipitates were filtered and dried to give crude product. The crude hydroxyantrip quinone (8) was purified by column chromatography using acetone:toluene (1:1) to give 2-OH (0.50 g, 11%). $^1H$ NMR (500 MHz, $CDCl_3$) δ 8.61 (s, 6H), 8.38 (s, 6H), 8.26 (m, 6H), 7.77 (m, 6H), 6.05 (s, 1H). $^{13}C$ NMR (125 MHz, $(CD_3)_2SO$) δ 181.8, 181.7, 150.0, 149.7, 135.7, 134.0, 132.8, 131.7, 131.5, 126.4, 122.0, 118.8, 80.5, 50.7, 30.2. IR (ATR) [$cm^{-1}$] 1745, 1674, 1591, 1294, 1224, 1117, 967, 792, 744, 714. HRMS calcd for $C_{44}O_7H_{20}$ 660.1209. found 661.1258 $[MH]^+$.

The hydroxyantrip quinone (8) (1.2 g, 1.8 mmol) was dissolved was dissolved in acetic acid (90 mL), followed by addition of hydriodic acid (30 mL). The reaction mixture was refluxed for 4 d. After that time the reaction mixture was cooled to room temperature and poured into saturated solution of sodium sulfite (200 mL). The precipitated solids were filtered, washed with water, and dried under vacuum. The solids were dissolved in chloroform (100 mL) and passed through a silica plug (~10 g $SiO_2$). The organic solvent was evaporated to give a mixture of partially hydrogenated hydroxyantrip (9) (0.60 g).

The partially hydrogenated hydroxyantrip (9) (0.60 g, 1.04 mmol) was dissolved in xylenes (180 mL), followed by addition of Pd/C (2.5 g). The mixture was refluxed for 2 d. After that time the reaction mixture was cooled to room temperature. The Pd/C was filtered and the filtrate was evaporated to give crude product (0.18 g). The crude product was purified by column chromatography using hexane:methylene chloride (2:10), to give hydroxyantrip (10) (0.075 g, 12%). $^1H$ NMR (500 MHz, $CDCl_3$) δ 8.32 (s, 1H), 8.29 (s, 1H), 8.17 (s, 1H), 8.01 (s, 1H), 7.94-7.91 (m, 6H), 7.43-7.37 (m, 6H), 5.78 (s, 1H), 3.80 (s, 1H). $^{13}C$ NMR (500 MHz, $CDCl_3$) δ 140.9, 138.3, 132.1, 132.0, 131.0, 130.6, 128.3, 128.2, 126.6, 126.0, 125.5, 125.4, 122.0, 118.1, 79.6, 52.2. IR (ATR) [$cm^{-1}$] 3375, 3043, 1424, 1293, 1203, 1027, 890, 736, 639. HRMS calcd for $C_{44}O_1H_{26}$570.1984. found 570.1972. m.p.>243° C. (decomposes).

Hydroxyantrip (10) (0.050 g, 0.087 mmol) was dissolved in DMF (6 mL) and degassed in a three-neck round-bottomed flask. Then NaH (6.3 mg, 0.26 mmol) was added. The reaction mixture was stirred for 30 min, followed by addition of 7,7,7-triphenyl-3,6-dioxaheptyl-p-toluenesulfonate (0.262 g, 0.522 mmol). The reaction was then heated at 40° C. for 2 days. The solvent was evaporated using kugelrhor at 100° C. The residue is dissolved in chloroform (50 mL) and passed through a silica plug (~10 g $SiO_2$). The first chloroform fraction is collected and the solvent is evaporated. The residue is dissolved in dichloromethane (10 mL) and conc. HCl (10 mL) is added to it and stirred for 20 min. The organic layer is separated and passed through a silica plug to give clean antrip-DEG (5) (4 mg, 7%). $^1H$ NMR (500 MHz, $CDCl_3$) δ 8.39-8.33 (d, J=11.1 Hz, 6H), 8.28 (s, 3H), 8.00 (s, 3H), 7.96-7.89 (m, 6H), 7.42-7.36 (m, 6H), 5.67 (s, 1H), 5.20-5.14 (t, J=4.7 Hz, 2H), 4.52-4.46 (t, J=4.7 Hz, 2H), 4.16-4.05 (m, 4H). $^{13}C$ NMR (125 MHz, $CDCl_3$) δ 139.8, 138.9, 132.1, 132.0, 130.7, 130.6, 128.3, 128.2, 126.8, 125.8, 125.5, 125.4, 121.7, 120.8, 85.2, 73.6, 72.4, 67.1, 62.5, 52.9. HRMS calcd for $C_{48}O_3H_{34}$ 658.2508. found 658.2484. m.p.>243° C. (decomposes).

Antrip-DEG was spread from a dilute (1 mg/mL) 1:1 chloroform:cyclohexane solution at the gas/liquid interface in a Langmuir-Blodgett apparatus. The monolayer was compressed to a mean molecular area of ~70 $Å^2$. Irradiation at constant surface pressure with 400 nm light from 40 W LED for 1 h gave afforded the 2DP. The 2DP was characterized by AFM height analysis after Langmuir-Sheaffer transfer to a Si substrate.

Exfoliation Solvent Screen

Several solvents with varying surface tensions were used for exfoliation of polyantrip into thin sheets. Optical microscopy was used to demonstrate the presence of thin sheets. The extent of exfoliation was graded on the basis of optical microscopy. The table below lists the solvents screened and the level of exfoliation.

TABLE 1

Exfoliation scale (by optical microscopy).:

| Trial | Solvent | Scale* |
|---|---|---|
| 1 | Mesitylene | D |
| 2 | n-Butyl benzene | D |
| 3 | N,N-Diethyl-meta-toluamide | D |
| 4 | t-Butyl toluene | D |
| 5 | DMSO | A |
| 6 | N-Methyl pyrrolidone | A |
| 7 | o-Dichlorobenzene | B |
| 8 | o-Xylene | D |
| 9 | p-Xylene | D |
| 10 | 1,2-Dimethoxyethane | C |
| 11 | Diphenylacetone | B |
| 12 | 1,2,4-Trichlorobenzene | B |
| 13 | Bromobenzene | C |
| 14 | Isopropanol | D |
| 15 | Methanol | D |
| 16 | Benzaldehyde | B |
| 17 | Quinoline | A |
| 18 | Cyclopentanone | A |
| 19 | 1-Napthaldehyde | B |
| 20 | 1-Bromonaphthalene | B |
| 21 | 1-Methylnaphthalene | B |
| 22 | Diphenylmethane | D |
| 23 | o-Dibromobenzene | B |
| 24 | Piperidine | B |
| 25 | Octafluorotoluene | D |
| 26 | 1,4-Difluorobenzene | D |
| 27 | Hexafluorobenzene | D |
| 28 | 1-Bromo-4-fluorobenzene | C |
| 29 | Dimethylacetamide | A |

*A (Best); B (Good); C (Ok); and D (Not good)

Exfoliation of Polyantrip

In one example, to the irradiated crystals (13.3 mg), N-methylpyrrolidone (NMP) was added (2.8 mL). The mixture was left overnight at room temperature for exfoliation. The insoluble material was collected by centrifugation. The solids were washed with methanol (30 mL) and centrifuged. The process was repeated 4 times to remove any traces of NMP. The exfoliated solid was separated and dried under vacuum (8.5 mg). The insoluble irradiated crystals can be exfoliated down to few or single layer sheets by heating in cyclopentanone, or 1-methyl-2-pyrrolidone. Few layer sheets can be obtained by heating at 50° C. for 1 week. Exfoliation down to single layer sheets was accomplished by heating at 50° C. for 3 weeks.

In one example, antrip-DEG was polymerized at the air-water interface and transferred to nylon membrane substrate. The nitrogen permeance, determined by measuring the flow as a function of pressure through the system, of the poly (antrip-DEG) substrate assembly was found to be nearly as high as through the uncoated nylon substrate.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto.

I claim:

1. A method of making a two dimensional polymer derived from a polycyclic, three-bladed monomer, comprising:
    forming crystals of the monomer from a first organic solvent;
    isolating the crystals of the monomer; and
    irradiating the crystals of the monomer in a solid-state with ultraviolet (uv) radiation to form the two dimensional polymer in the solid state.

2. The method of claim 1, wherein the uv radiation is 400 nm wavelength light.

3. The method of claim 1, wherein the polycyclic, three-bladed monomer is a polyaromatic, three-bladed monomer.

4. The method of claim 1, wherein the polycyclic, three-bladed monomer is an antrip monomer or derivatives and analogues thereof comprising a triptycene core and three anthracene moieties.

5. The method of claim 4, wherein the two dimensional polymer comprises repeat units including the triptycene core.

6. The method of claim 4, wherein the two dimensional polymer comprises repeat units including anthracene dimers.

7. The method of claim 6, wherein the anthracene dimers are dimerized across each C9-C10 position of the anthracene moieties.

8. The method of claim 1, wherein the first organic solvent is selected from the group consisting of benzene, tetrahydrofuran, chlorobenzene, mesitylene, fluorobenzene, carbon disulfide, chloroform, 1,2-dibromobenzene, and combinations thereof.

9. The method of claim 1, further comprising:
    suspending the two dimensional polymer in the solid state in a second organic solvent to exfoliate sheets of the two dimensional polymer.

10. The method of claim 9, wherein the second organic solvent is selected from the group consisting of N-methyl-pyrrolidone, dimethyl sulfoxide, quinoline, and combinations thereof.

11. The method of claim 9, further comprising: isolating the exfoliated sheets of the two dimensional polymer.

12. The method of claim 9, wherein the exfoliated sheets of the two dimensional polymer have a thickness less than 1 μm.

13. A method of making a two dimensional polymer comprising repeat units that are derived from an antrip monomer or derivatives and analogues thereof comprising a tripycene core and three anthracene moieties, the method comprising:
    forming crystals of the monomer from a first organic solvent;
    isolating the crystals of the monomer;
    irradiating the crystals of the monomer in a solid-state with ultraviolet radiation having a 400 nm wavelength to form the two dimensional polymer in the solid state; and
    suspending the two dimensional polymer in the solid state in a second organic solvent to exfoliate sheets of the two dimensional polymer,
    wherein the first organic solvent is selected from the group consisting of benzene, tetrahydrofuran, chlorobenzene, mesitylene, fluorobenzene, carbon disulfide, chloroform, 1,2-dibromobenzene, or combinations thereof; and
    wherein the second organic solvent is selected from the group consisting of N-methyl-pyrrolidone, dimethyl sulfoxide, quinoline, and combinations thereof.

14. The method of claim 13, wherein the exfoliated sheets of the two dimensional polymer have a thickness less than 1 μm.

* * * * *